(12) United States Patent
Keller et al.

(10) Patent No.: US 11,023,640 B1
(45) Date of Patent: Jun. 1, 2021

(54) METHODS, SYSTEMS, AND COMPUTER PROGRAM PRODUCT FOR CHARACTERIZING TIMING BEHAVIOR OF AN ELECTRONIC DESIGN WITH A DERIVED CURRENT WAVEFORM

(71) Applicant: Cadence Design Systems, Inc., San Jose, CA (US)

(72) Inventors: Igor Keller, Pleasanton, CA (US); Chirayu S. Amin, Hillsboro, OR (US); Omid Assare, Milpitas, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/931,553

(22) Filed: May 13, 2020

(51) Int. Cl.
| | |
|---|---|
| *G06F 30/367* | (2020.01) |
| *G06F 119/12* | (2020.01) |
| *G06F 111/04* | (2020.01) |
| *G06F 119/06* | (2020.01) |
| *G06F 115/10* | (2020.01) |

(52) U.S. Cl.
CPC ........ *G06F 30/367* (2020.01); *G06F 2111/04* (2020.01); *G06F 2115/10* (2020.01); *G06F 2119/06* (2020.01); *G06F 2119/12* (2020.01)

(58) Field of Classification Search
CPC .............. G06F 30/367; G06F 2119/12; G06F 2119/06; G06F 30/3312; G06F 2111/04; G01R 31/318364
USPC .................................. 716/108, 136; 703/14
See application file for complete search history.

(56) References Cited

U.S. PATENT DOCUMENTS

| | | |
|---|---|---|
| 7,359,843 B1 | 4/2008 | Keller |
| 7,464,349 B1 | 12/2008 | Keller |
| 7,562,323 B1 | 7/2009 | Bai |
| 7,761,826 B1 | 7/2010 | Thanvantri |
| 7,882,471 B1 | 2/2011 | Kariat |
| 7,983,891 B1 | 7/2011 | Keller |
| 8,104,006 B2 | 1/2012 | Kariat |
| 8,543,954 B1 | 9/2013 | Keller |
| 8,615,725 B1 | 12/2013 | Keller |
| 8,726,211 B2 | 5/2014 | Phillips |
| 8,782,583 B1 | 7/2014 | Tiwary |
| 8,924,905 B1 | 12/2014 | Keller |
| 8,938,703 B1 | 1/2015 | Saurabh |
| 8,966,421 B1 | 2/2015 | Kariat |
| 9,003,342 B1 | 4/2015 | Keller |
| 9,129,078 B1 | 9/2015 | Keller |
| 9,384,310 B1 | 7/2016 | Keller |
| 9,582,626 B1 | 2/2017 | Keller |
| 9,710,593 B1 | 7/2017 | Keller |

(Continued)

OTHER PUBLICATIONS

U.S. Appl. No. 16/705,125, filed Dec. 5, 2019.

*Primary Examiner* — Paul Dinh
(74) *Attorney, Agent, or Firm* — Vista IP Law Group, LLP

(57) ABSTRACT

Disclosed are methods, systems, and articles of manufacture for characterizing timing behavior of an electronic design with a derived current waveform. A set of inputs is determined from a set of electrical characteristics of an electronic design or a portion thereof. Moreover, A derived current waveform is determined at one or more modules stored in memory and executing in conjunction with a microprocessor of a computing node based at least in part upon the set of inputs. The electronic design or the portion thereof is characterized based at least in part upon the derived current waveform.

20 Claims, 11 Drawing Sheets

(56) References Cited

U.S. PATENT DOCUMENTS

| | | |
|---|---|---|
| 9,881,123 B1 | 1/2018 | Ratnakar |
| 9,928,324 B1 | 3/2018 | Keller |
| 10,073,934 B1 | 9/2018 | Keller |
| 10,185,795 B1 | 1/2019 | Keller |
| 10,192,012 B1 | 1/2019 | Wehbeh |
| 10,275,554 B1 | 4/2019 | Chetin |
| 10,430,536 B1 | 10/2019 | Keller |
| 10,789,406 B1 | 9/2020 | Raja |
| 2004/0054974 A1* | 3/2004 | Acar ............... G06F 30/367 716/109 |
| 2006/0225009 A1* | 10/2006 | Reddy ............. G06F 30/367 716/136 |
| 2009/0112550 A1* | 4/2009 | Aikawa ....... G01R 31/318364 703/14 |
| 2011/0313738 A1* | 12/2011 | Stamoulis ........ G06F 30/367 703/14 |

* cited by examiner

METHODS, SYSTEMS, AND COMPUTER PROGRAM PRODUCT FOR CHARACTERIZING TIMING BEHAVIOR OF AN ELECTRONIC DESIGN WITH A DERIVED CURRENT WAVEFORM

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high-level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

An integrated circuit designer may use a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

As electronic designs become more and more complex with very little or no room for silicon recall due to prohibitive cost, designers tend to spend much time during the early design stages doing prototyping and floorplanning by, for example, performing various what-if analyses and/or manual adjustment during the floorplanning stage. When performing the what-if analyses or manual floorplan adjustments, a designer may spend a significant amount of time awaiting the results of each floorplan iteration. For example, a designer may identify a critical path that fails to meet the available slack for the path and thus need to move one or more instances connected by the path to satisfy the timing requirements.

The design in this case may need to calculate the new distance after moving the one or more instances, check whether moving the one or more instances does not create additional critical path(s). The designer may often need to run additional timing commands due to the unavailability of timing information for these paths that are made critical due to the moving of the one or more instances. Once the timing or slack information or data for these additional path(s) is determined, the designer may need to determine whether one or more other components or models in the same electronic design may need to be moved to make sure that no additional paths violate the timing requirements due to the designer's moving the one or more instances in the floorplan. The designer may encounter similar issues at this stage due to the lack of timing information for one or more paths connecting these one or more other components or models. Consequently, a designer may spend up to 70% of the total design cycle time and days or even weeks during the prototyping and floorplanning stage.

Conventional approaches characterize a timing library or a model (e.g., a current model) by simulating a cell with a certain input waveform and an output load and record the current and voltage waveforms at the output. Such a result almost always produces more data points than a modern, state-of-the-art computing system may handle. As a result, conventional approaches almost always opt for pruning the maximum number of points on the current waveform while still unable to guarantee that when the current waveform is integrated, the slew and reference times may approximately match the voltage values within acceptable tolerances.

Moreover, these conventional approaches provide no guarantees for accuracy for the rest of the voltage thresholds on integrated waveform. Furthermore, even slew and reference times might match the values provided in, for example, an NDLM (Non-Linear Delay Model) table approximately, but the tail of the integrated voltage transition is also not guaranteed to reach full rail. In addition, the number of points maintained in the current waveform in these conventional approaches is typically high (e.g., more than 40 points) and thus results in a large size of model and hence a large size of timing library that inevitably hinder the performance, efficiency, and/or effectiveness of such approaches.

Therefore, there is a need for methods, systems, and computer program products for characterizing an electronic design with a susceptibility window in a more accurate, efficient, and effective manner and to address at least the aforementioned issues and shortcomings.

SUMMARY

Disclosed are method(s), system(s), and article(s) of manufacture for characterizing timing behavior of an electronic design with a derived current waveform in one or more embodiments. Some embodiments are directed at a method for characterizing timing behavior of an electronic design with a derived current waveform. These embodiments determine a set of inputs from a set of electrical characteristics of an electronic design or a portion thereof. Moreover, A derived current waveform is determined at one or more modules stored in memory and executing in conjunction with a microprocessor of a computing node based at least in part upon the set of inputs. The electronic design or the portion thereof is characterized based at least in part upon the derived current waveform.

Some embodiments further determine a set of simulated voltage values from the set of electrical characteristics based at least in part upon one or more criteria and determine a set of time points, wherein each time point in the set of time points corresponds to a simulated voltage value in the set of simulated voltage values. In some of these embodiments, a set of simulated current values may be determined from the set of electrical characteristics based at least in part upon the set of time points. In addition or in the alternative, an output load may be determined for the electronic design or the portion thereof.

Some embodiments receive the set of inputs and an output load for the electronic design or the portion thereof and determine a time-domain expression for a time-varying current, wherein the time-domain expression correlates the time-varying current with the set of inputs. In some of these embodiments, an initial voltage value may be determined for the time-domain expression for the time-varying current; and a derived current value may also be determined at a time point of a set of time points, wherein the time point in the set of time points corresponds to a simulated voltage value in a set of simulated voltage values of the set of inputs.

In some of the immediately preceding embodiments, the derived current waveform may be determined based at least in part upon the derived current value at the time point of the set of time points. In addition or in the alternative, an initial derived current value may be determined for the derived current waveform.

Some embodiments receive the set of inputs and an output load for the electronic design or the portion thereof and determine a time-domain expression for voltage, wherein the time-domain expression correlates the voltage with a time-varying current. In some of these embodiments, a set of expressions may be determined for a set of derived current values at least by using an integration technique with the time-domain expression of the voltage; and an additional constraint may also be determined for the set of expressions.

Some of the immediately preceding embodiments determine a derived current value with at least the additional constraint and the set of expressions for derived current values and further determine one or more remaining derived current values with at least the derived current value and the set of expressions based at least in part upon a set of simulated voltage values in the set of inputs. In some of these embodiments, the derived current waveform may be determined based at least in part upon the derived current value and the one or more remaining derived current values.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
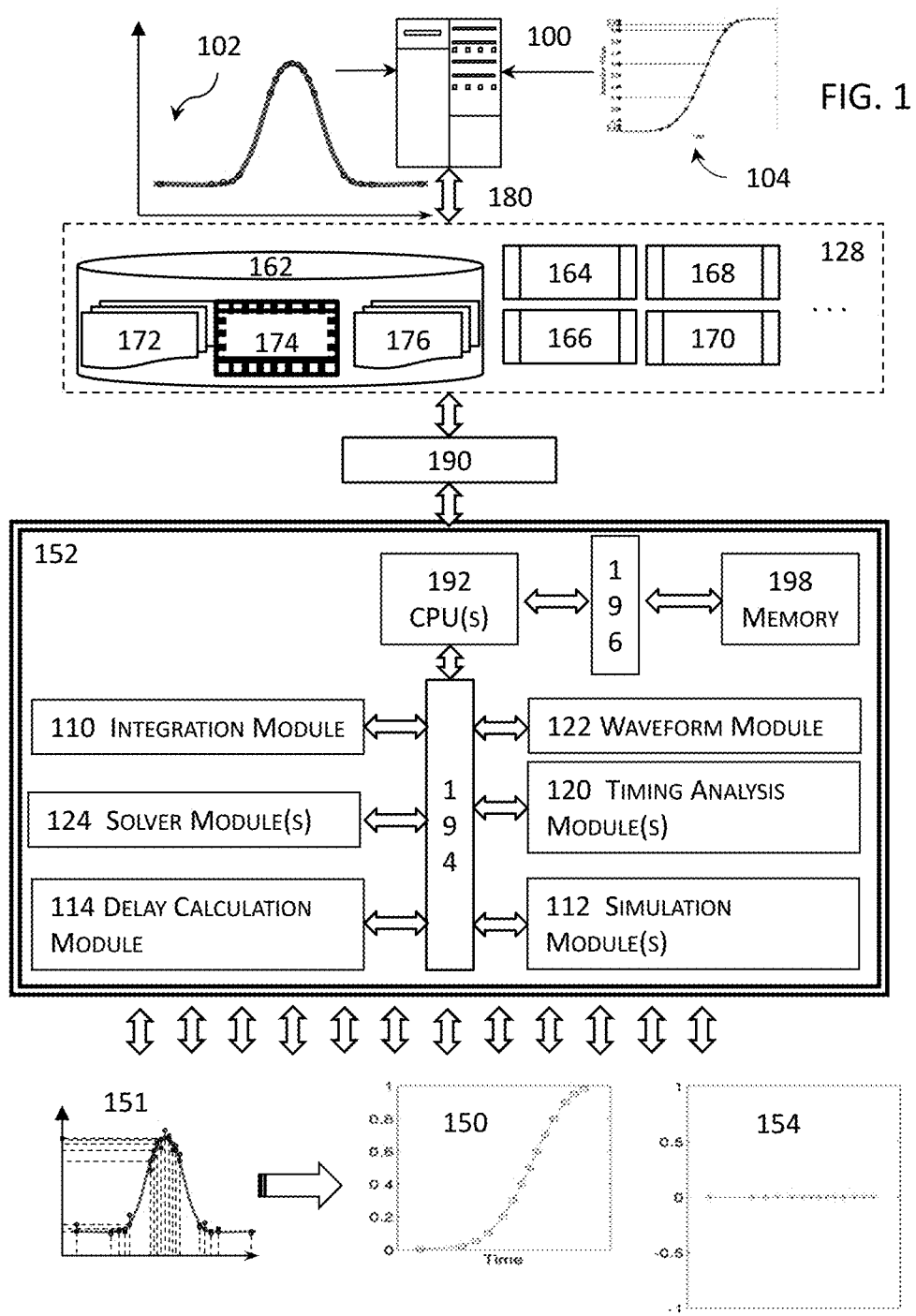
FIG. 1 illustrates a high-level block diagram of a simplified system for characterizing timing behavior of an electronic design with a derived current waveform in one or more embodiments.

Various embodiments described herein are directed to characterizing timing behavior of an electronic design with a derived current waveform. A set of electrical characteristics may be first obtained from, for example, a rigorous circuit simulation such as a SPICE (Simulation Program with Integrated Circuit Emphasis) or a SPICE-like simulation (e.g., a FastSPICE, HSPICE, PSPICE, or any other SPICE-based or SPICE-compatible simulation) or any other suitable simulation or analysis that is commonly used to implement simulation of an analog or mixed-signal electronic circuit. For digital circuits, equivalent digital simulation may be performed to produce the set of electrical characteristics.

This set of electrical characteristics may include, for example, a voltage waveform or a set of discrete voltage values at a corresponding set of time points of an electronic circuit component, a current waveform or a set of discrete current values at the corresponding set of time points, or any other electrical characteristics suitable for a subsequent characterization of timing behavior of the electronic circuit or a portion (e.g., a transistor such as a MOSFET or Metal-oxide-semiconductor field-effect transistor, a cell) thereof.

In order to determine a current waveform with a set of current values, various embodiments formulate a relationship (e.g., an integral equation, etc.) between a time-domain expression of the current and voltages by using the set of electrical characteristics (e.g., a set of voltage values, a set of current values, etc.) as a set of inputs. To distinguish a set of current values in the set of electrical characteristics from the subsequently described set of derived current values, a set of current values, if any, in the set of electrical characteristics used as a set of input is hereinafter referred as a set of simulated current values because these current values may be obtained from, for example, a rigorous circuit simulation.

These embodiments further use an integration technique (e.g., the Euler method, the trapezoidal rule, or any other suitable numerical integration techniques) to transform the relationship into a set of relationships (e.g., algebraic equations, etc.) to determine or compute a set of derived current values at a set of time points that corresponds to the set of electrical characteristics (e.g., voltage values). These embodiments then represent the current waveform with the derived set of derived current values.

A set of derived current values is determined by solving for these derived current values from the aforementioned relationship between voltage and current using, for example, at least the set of electrical characteristics as a set of input in an integration technique. In these embodiments, discrete voltage values at selected time points on a voltage waveform in the set of electrical characteristics are referenced in the aforementioned set of relationships and will thus be exactly matched once the current values are solved from the set of relationships (e.g., algebraic equations).

Conventional approaches merely approximately determine a set of current values that may exhibit certain deviations from the set of simulated current values. Although these deviations between computed current values (or computed current waveform) and simulated current values (or computed current waveform) may be small within some acceptable tolerances, these computed current values may nevertheless produce bigger and unacceptable deviations in corresponding voltage values when computed current values or current waveform is used to compute the corresponding voltage values at the set of time points.

Unlike conventional approaches, various embodiments formulate the aforementioned set of relationships with discrete voltage values at selected time points on a voltage waveform in the set of electrical characteristics. These embodiments then solve the set of relationships to obtain the derived current values at the set of time points. Therefore, the discrete, simulated voltage values from the set of electrical characteristics obtained from, for example, a rigorous simulation may be exactly matched, nearly exactly or substantially matched (e.g., with negligible deviations after accounting a practical engineering consideration), or approximately matched (e.g., within a design or market requirement, a practical engineering consideration, etc.) by the derived current values that are solved from the set of relationships (e.g., algebraic equations).

Various embodiments thus provide the flexibility in selecting and determining a derived current value at a time point in solving the set of relationships so long as the set of simulated voltage values may be exactly matched, substantially matched, or approximately matched. That is, a derived current value at a time point may exhibit a large deviation from the corresponding simulated current value at that time point in some embodiments.

That is, unlike conventional approaches that attempt to fit the current waveform with a set of selected current values as closely as possible within a reasonable period of computation time, some embodiments solve for derived current values at the set of time points while allowing the derived current values to deviate from the corresponding current values in the set of inputs during the solution process so long as certain constraints (e.g., the set of voltage values in the set of inputs used to define the solution process, one or more additional constraints, etc.) are satisfied.

In other words, these embodiments allow the derived current values to deviate from their corresponding values from, for example, a simulation so long as the set of simulated voltage values from the simulation is exactly, nearly exactly, or approximately matched. As a result, the set of derived current values determined herein guarantees an exact match or nearly exact match (e.g., with negligible deviation(s) permitted by a design or market requirement, a practical engineering consideration, etc.) to the set of simulated voltage values from, for example, a rigorous circuit simulation.

It shall be noted that some example techniques described below provide an exact match between a set of simulated current values (e.g., current values from a SPICE simulated current waveform) and a set of derived current values determined by these example techniques described below, although other techniques that provide substantial or approximate match between the aforementioned two sets are also contemplated and may also be used to determine a set of derived current values.

It shall be further noted that although some embodiments described herein allow large deviations between derived current values and simulated current values (e.g., from a SPICE simulation), some other embodiments will nevertheless select or determine one or more derived current values closer to the one or more corresponding simulated current values based at least in part upon one or more factors. These one or more factors may include, for example, a requirement for numerical stability, a display or aesthetic requirement for displaying the selected/determined derived current values in a user interface, etc. For example, selecting or determining one or more derived current values that deviate from the one or more corresponding simulated current values beyond a certain extent or threshold may introduce numerical instability in the solution process to solve for derived current values or in subsequent analyses.

Unlike conventional approaches that start with a larger set of values (e.g., current values, voltage values, etc.) from a simulator and prune, trim, or filter this larger set to arrive a sufficiently small set so that state-of-the-art computing systems may handle, some embodiments described herein select a set of simulated values (e.g., voltage values) from a simulation result, identify the corresponding time points for these simulated values, and determine a set of derived current values that produces a set of derived voltage values that exactly match the set of simulated current values at these corresponding time points, without filtering, trimming, or pruning.

Conventional approaches described immediately above often result in a model (e.g., a current model) having about forty (40) points (e.g., forty current values for a current waveform) while still unable to guarantee a reasonably good match to the simulated voltage values and hence produce poor timing behavior characterization results. In contrast, some embodiments described herein select about 8-15 simulated voltage values at corresponding time points, determine the set of derived current values for the derived current waveform at these corresponding time points while providing an exact match between the derived voltage values (obtained from the derived current values or derived current waveform) and the simulated voltage values and thus provide a more efficient and more accurate characterization of an electronic design or a portion thereof with much less computational resources.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present inventions. All such modifications are intended to be within the scope of claims associated with this disclosure.

FIG. 1 illustrates a high-level block diagram of a simplified system for characterizing timing behavior of an electronic design with a derived current waveform in one or more embodiments. More specifically, the computing system 100 in FIG. 1 may comprise one or more physical computing systems or virtual machines 100, such as a general-purpose computer described in the System Architecture Overview section to implement one or more special proposes. The illustrative system in FIG. 1 may include an Internet-based computing platform providing a shared pool of configurable computer processing resources (e.g., computer networks, servers, storage, applications, services, a cloud environment, etc.) and data to other computers and devices in a ubiquitous, on-demand basis via the Internet. For example, one or more computing resources and/or modules illustrated in FIG. 1 may be located in a cloud computing platform where computing resources (e.g., storage resources, compute resources, etc.) are provided on an on-demand basis without direct active management by users in some embodiments.

In this system illustrated in FIG. 1, one or more computing systems 100 may invoke and execute various modules to identify a first subset of inputs 102 (e.g., a current waveform, a set of current values, a set of time points corresponding to the aforementioned set of simulated current values, etc.) as well as a second subset of inputs 104 (e.g., a simulated voltage waveform, a set of simulated voltage values, a current waveform, a set of current values, a set of time points corresponding to the aforementioned sets of simulated voltage and simulated current values, etc.) of an electronic design or a portion thereof (e.g., a cell, a MOSFET, etc.) A set of input may be provided by, for example, one or more simulation modules 112 (e.g., a SPICE or a SPICE-like simulation such as a FastSPICE, HSPICE, PSPICE, or any other SPICE-based or SPICE-compatible simulation) or any other suitable simulation module(s).

The one or more computing systems 100 may invoke and execute a plurality of modules 152, which are specifically programmed and stored at least partially in memory of and functions in conjunction with at least one microprocessor (e.g., a central computing unit, a virtualized microprocessor, etc. 192) or processor core of the one or more computing systems 100, to perform various functions to determine a set of derived current values 151 that may be used to represent a derived current waveform 150. As described above, this set of derived current values 151 may produce an exact match (or a substantial match or an approximate match in other embodiments) to the set of simulated voltage values 104 in some embodiments. As a result, the errors or deviations 154 between the set of derived voltage values obtained from the derived current waveform and the set of simulated voltage vales are zero in these embodiments (or negligible in other embodiments that produce a substantial or an approximate match).

This set of derived current values 151 and/or the set of derived voltage values 150 may be further provided back to one or more modules in the plurality of modules 152 which may further perform one or more tasks to characterize the electronic design or the portion thereof. For example, a timing analysis module or engine 120 may perform a timing analysis to characterize the timing behavior of the electronic design or a portion (e.g., a cell, a net, a net segment, etc.) thereof. As another example, a delay calculation module or engine 114 may perform a delay calculation to calculate, for example, the gate delay of a gate and one or more interconnects attached to the gate in the electronic design or a portion thereof by using, for example, Elmore delay approximation, lumped capacitance method, moment matching method, simulation(s), or any other suitable delay calculation methods.

Moreover, the one or more computing systems 100 may execute an integration module (110) that performs one or more integration techniques (e.g., the Euler method, the trapezoidal rule, etc.) pertaining to the determination or solution for derived current values. The one or more computing systems 100 may also execute one or more solver modules 124 that selects and/or determines a set of derived current values that corresponds to a set of simulated voltage values (and hence a set of simulated current values) at a set of time points. More details about the determination of a set of derived current values are described below.

With the set of derived current values, the one or more computing systems 100 may execute a waveform module 122 to construct a derived current waveform for the electronic design of interest or a portion thereof. The computing system may also include one or more modules in the set of modules 152.

One or more modules in the set 152 may include or at least function in conjunction with a microprocessor 192 (e.g., a central processing unit or CPU) via a system bus 194 to access or invoke various modules in 152 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a data bus 196 to read and/or write data during the microprocessor's execution of processes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise, for example, a floorplanner, a global routing engine, and/or a detail routing engine 164, a layout editor 166, a design rule checker 168, a verification engine 170, etc.

These various resources 128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design.

For example, these various resources 128 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

Strictly as an example, the one or more signoff modules may individually or in conjunction with one or more other modules (e.g., a timing analysis module 120 or a delay calculation module 114) perform one or more timing analyses and/or timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., FastSPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Once sign-off and/or design closure is achieved, the electronic design is finalized for tapeout; and the electronic design is transmitted to mask fabrication equipment for mask preparation and mask writing to produce photomasks that are then used in the actual manufacturing of the electronic circuits represented by the electronic design.

The one or more computing systems 100 may further write to and read from a local or remote (e.g., networked storage device(s), virtualized storage resource(s), etc.) non-transitory computer accessible storage 162 that stores thereupon data or information such as, but not limited to, one or more databases (174) such as schematic design database(s) or physical design database(s), electronic circuit design specification database(s), techfiles for multiple design fabrics, various statistics, various data, rule decks, various design rules, constraints, etc. (172), or other pertinent information or data (176) that may be used to facilitate the performance of various functions described herein.

In some embodiments, the computing system 100 may include the various resources 128 such that these various resources may be invoked from within the computing system via a network or a computer bus 190 (e.g., an internet session, an intranet session, a data bus 196 interfacing a physical or virtual microprocessor 192 and the non-transitory computer accessible storage medium 198 (e.g., memory) or a system bus 194 between a microprocessor 192 and one or more engines or modules in the various resources 128). In some other embodiments, some or all of these various resources may be located remotely from the computing system 100 such that the computing system may access the some or all of these resources via a computer bus 190 and one or more network components.

In some embodiments, the computing system 100 may include the various resources 128 such that these various resources may be invoked from within the computing system via a system bus 194 (e.g., a data bus interfacing a microprocessor 192 and the non-transitory computer accessible storage medium 198 or a computer bus 190 between a microprocessor 192 and one or more engines in the various resources 128). In some other embodiments, some or all of these various resources may be located remotely from the computing system 100 such that a computing system 100 may access the some or all of these resources via a computer bus and/or one or more network components.

Each of various modules and engines described herein may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100E for execution.

Figure 2A:
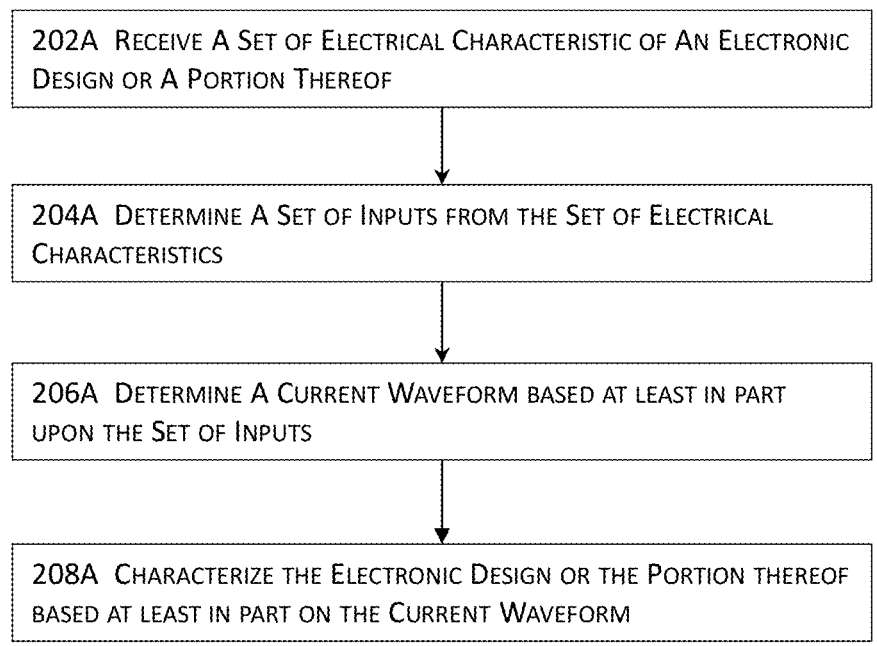
FIG. 2A illustrates a high-level flow diagram for characterizing timing behavior of an electronic design with a derived current waveform in one or more embodiments.

FIG. 2A illustrates a high-level flow diagram for characterizing timing behavior of an electronic design with a derived current waveform in one or more embodiments. A set of electrical characteristics of an electronic design or a portion thereof may be received at 202A. As this set of electrical characteristics may be obtained from a simulation result, this set of values is herein referred to as a set of simulated values (e.g., a set of simulated voltage values, a set of simulated current values, etc.) An electrical characteristic may include, for example, a voltage waveform, a set of voltage values, a current waveform, a set of current values, etc. obtained from, for example, a simulation result such as a SPICE or SPICE-like simulation.

A set of inputs may then be determined at 204A from the set of electrical characteristics. A set of inputs may include, for example, a set of voltage values, a set of current values, etc. Because the set of electrical characteristics may be obtained from a simulation result, a set of inputs is herein referred to as a set of simulated inputs (e.g., a set of simulated voltage values, a set of simulated current values, etc.) to distinguish from derived values (e.g., a set of derived current values described below). More details about determining a set of inputs will be described below with reference to FIG. 2B.

With the set of inputs determined at 204A, some embodiments determine a derived current waveform at 206A based at least in part upon the set of inputs. As described above, a derived current waveform may be determined from a set of derived current values at a set of time points at which a set of electrical characteristics is obtained. This set of derived current values may be determined by using an integration technique and/or algebraic techniques that will be described below with reference to FIGS. 2C-2D. As will be described below, a set of derived current values may be determined in such a way that the corresponding set of derived voltage values exactly matches the set of simulated voltage values in some embodiments while an individual derived current value may exhibit a large deviation from the corresponding simulated current value at the corresponding time point. The electronic design or the portion thereof may then be characterized at 208A based at least in part upon the derived current waveform determined at 206A.

One of the advantages of various embodiments described herein is that a derived current waveform generated using techniques described herein not only guarantees that the derived voltage waveform produced by integrating the derived current waveform matches the simulated voltage waveform but also guarantees that slew and reference times match those in, for example, an NDLM table. Another advantage is that some embodiments also guarantee that an integrated voltage transition reaches the full rail. An additional advantage is that the number of points (e.g., the number of time points) in a derived current waveform is much smaller (e.g., 8-15 points) compared to around 40 nodes in a waveform generated with conventional approaches. Therefore, the size of the current waveform or model and the size of the library is greatly reduced with the techniques described herein.

With the derived current waveform, the timing behavior(s) of the electronic design or the portion thereof may be characterized based at least in part upon the set of inputs determined at 204A and the derived current waveform determined at 206A. For accurately computing, for example, delay, slew, and actual voltage waveform(s) for timing propagation in STA (static timing analysis), the integral (scaled by 1/capacitance) of the current waveform stored in the .lib file matches the driver output voltage waveform that is obtained from, for example, SPICE simulation during library characterization. Some embodiments described herein generate a set of derived current values representing the derived current waveform that, when integrated, produces voltage values or voltage waveform that exactly matches the simulated voltage values or the simulated voltage waveform. An advantage of these embodiments is that these embodiments provide accurate solution while consuming much less computational resource.

Figure 2B:
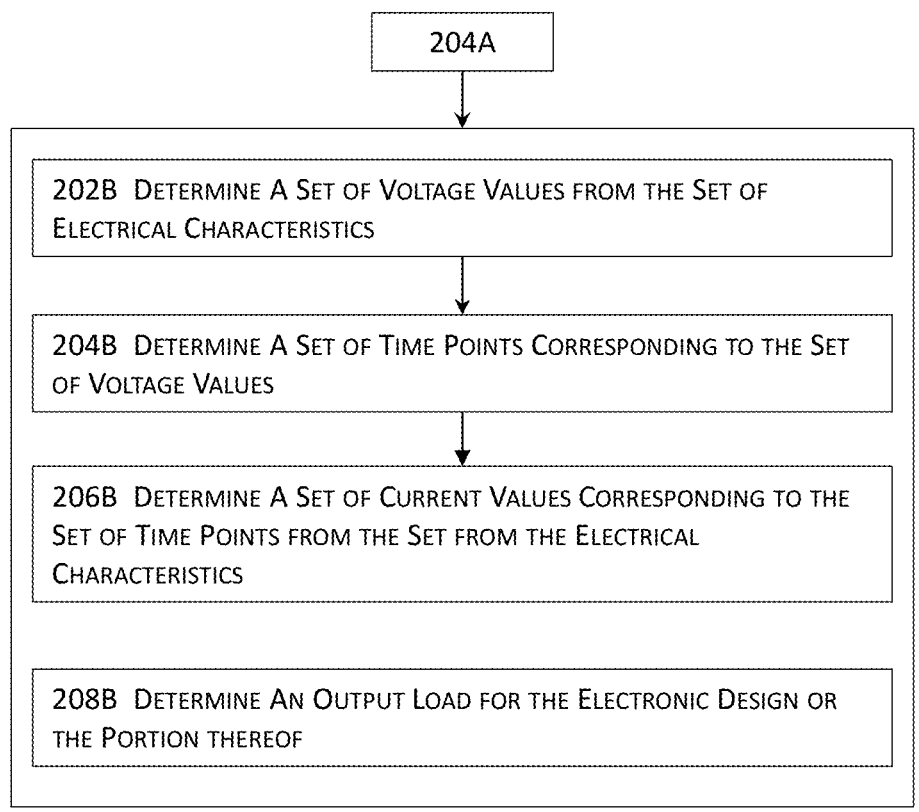
FIG. 2B illustrates more details about a portion of the high-level flow diagram illustrated in FIG. 2A in one or more embodiments.

FIG. 2B illustrates more details about a portion of the high-level flow diagram illustrated in FIG. 2A in one or more embodiments. More specifically, FIG. 2B illustrates more details of determining a set of inputs from the set of electrical characteristics at 204A of FIG. 2A. These embodiments illustrated in FIG. 2B first receive a set of electrical characteristics (e.g., received from a simulation). With the set of electrical characteristics, a set of voltage values each of which corresponding to a time point may be determined. A set of voltage values indicates voltage transitions or values that are of interest. For example, some embodiments may identify certain percentages of Vdd (e.g., 2%, . . . , 5%, . . . , 10%, . . . , 85%, . . . , 90%, . . . , 95%, . . . , 98%, etc.) into the set of voltage values although other methods may also be used to determine a set of voltage values.

Some embodiments described herein further identifies a set of time points that corresponds to the set of voltages determined above. For example, a time point may be identified into the set of time points for a specific voltage value in the set of voltage values when the voltage waveform in the set of electrical characteristics exhibits the specific voltage value. As a result, each time point in the set corresponds to a voltage value in the set of voltage values determined above.

With the set of time points identified, a set of simulated current values may also be determined based at least in part upon the set of time points from the set of electrical characteristics obtained from, for example, a rigorous circuit simulation. For example, a current value may be determined for a specific time point in the set of time points when the corresponding current waveform in the set of electrical characteristics crosses the specific time point. As a result, each time point in the set corresponds to a current value that may then be identified into the set of current values. this set of current values described above will be hereinafter referred to as the set of simulated current values to distinguish from another different set of current values that will be described later as a set of derived current values. A set of inputs may include other information or data in addition to a set of simulated voltage values, a set of time points each corresponding to a simulated voltage value, a set of simulated current values described above. More details about determining a set of inputs are described below with reference to at least FIG. 2A.

In these embodiments, a set of voltage values may be determined at 202B from the set of simulated electrical characteristics. For example, some embodiments may identify a plurality of simulated voltage values into the set of voltage values at 202B from a voltage waveform in the set of simulated electrical characteristics received at 202A. An output load may be determined at 208B for the electronic design or the portion thereof. This output load may be further referenced in determining various derived current values and the current waveform. An output load may be determined in many different ways with any known techniques. For example, an output load may be determined based on any assumptions that are also made in a current model in a timing library. For the ease of illustration and explanation, an output load is a lumped capacitive load in some embodiments.

A simulation result (e.g., a SPICE simulation result) often includes more data points (e.g., time points and corresponding electrical characteristic values) and is thus not suitable or practical for subsequent characterization of timing behaviors of an electronic design. Conventional approaches almost always opt for pruning, trimming, or filtering such a set of electrical characteristics. In contrast, some embodiments determine the set of derived voltage values at 202B by selecting, for example, certain percentages of a nominal or operating value, instead of or rather than pruning, trimming, or filtering one or more simulated voltage values from the simulation result (e.g., the set of electrical characteristics received at 202A).

For example, some embodiments may determine a set of simulated voltage values by identifying certain percentages of $V_{DD}$ (e.g., 2%, ..., 5%, ..., 10%, ..., 85%, ..., 90%, ..., 95%, ..., 98%, etc.) into the set of simulated voltage values. Some embodiments may identify a region in the simulated voltage curve between, for example, supplied 0V (or logic 0) and Vdd (or logic 1). For example, these embodiments may select one or more simulated voltage values in the region of 50% between supplied 0V (or logic 0) and Vdd (or logic 1). Some embodiments may select one or more simulated voltage values in a linear region where a transistor is switching. It shall be noted that any of the aforementioned embodiments or other determination/selection methods may be combined in any manner to determine a set of values at 202A.

With the set of voltage values determined at 202B, a set of time points may be determined at 204B. For example, a time point may be determined at 204B when a simulated voltage waveform from simulation crosses a selected voltage value determined at 202B. In this way, each time corresponding to a respective selected voltage value may be determined and identified into the set of time points at 204B. in some embodiments where the simulated voltage waveform crosses a selected voltage value determined at 202B multiple times, the latest time point at which the voltage waveform crosses the selected voltage value will be identified into the set of time points at 204B.

Once the set of time points is determined, a set of derived current values corresponding to the set of time points may be determined, selected, or formulated at 206B. As described herein, various embodiments determine a derived current value or the current waveform by solving for an integral equation including the time-varying current in the time domain so that the derived current waveform, when integrated, produces a derived voltage value or a derived voltage value that exactly matches the simulated voltage value at the same time point. More details about determining a set of derived current values will be described below with reference to FIGS. 2C-2D.

Figure 2C:
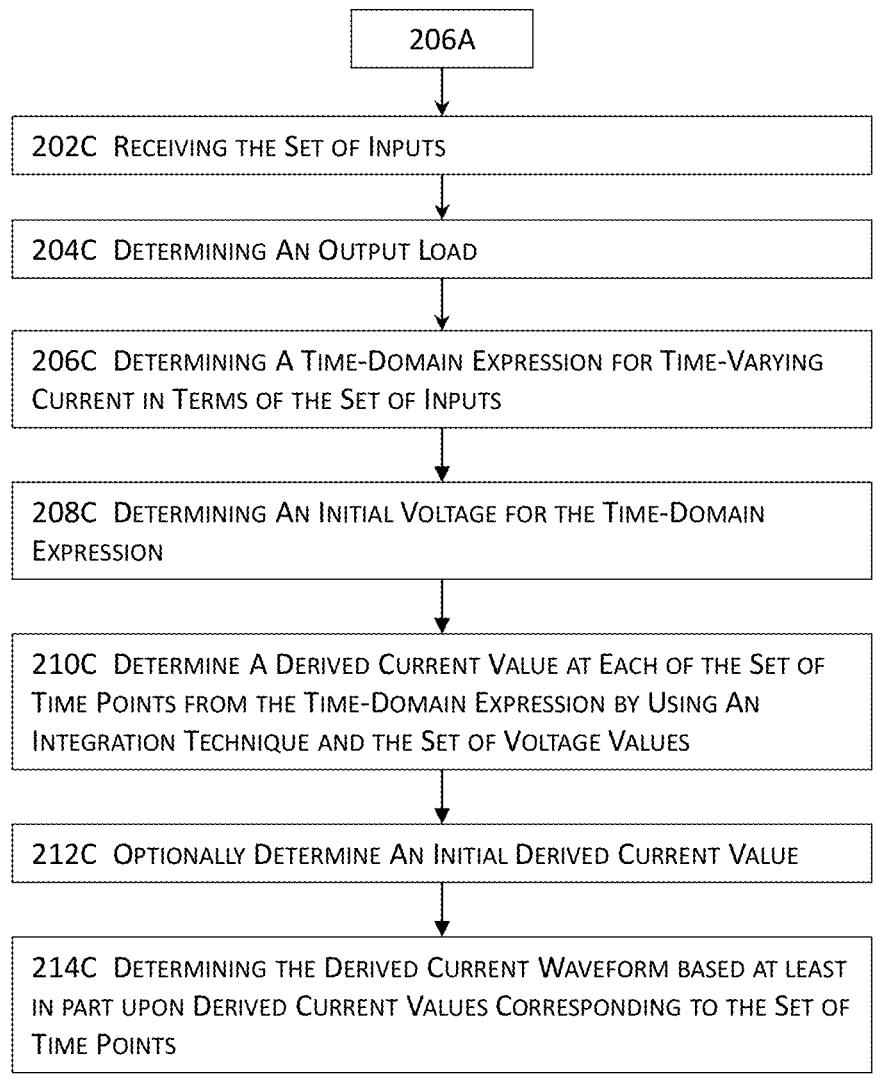
FIG. 2C illustrates more details about a portion of the high-level flow diagram illustrated in FIG. 2A in one or more embodiments.

FIG. 2C illustrates more details about a portion of the high-level flow diagram illustrated in FIG. 2A in one or more embodiments. More specifically, FIG. 2C illustrates more details of determining a current waveform at 206A of FIG. 2A or 206B of FIG. 2B.

Modern static timing analysis (STA) engine stage delay calculators use current source models for drivers. In some embodiments, these current source models may be the time domain Composite Current Source, abbreviated as CCST. A CCST model includes a time domain current waveform i(t) parameterized by input slew and output load C. For each slew and load combination, the waveform is stored as a set of time points and corresponding driver output current values in the pre-characterized timing library file (.lib). For stage delay and slew calculation in STA, time domain simulation may be performed to determine the driver output and the receiver input voltage waveforms. This simulation may require time-domain integration of the current i(t) to obtain the corresponding voltages under appropriate loading conditions for that stage.

For the ease of illustration and explanation, a simplified lumped loading capacitance C is assumed, and the time domain voltage v(t) may be expressed as follows for a voltage waveform illustrated in FIG. 3C:

$$\int_{t_0}^{t_n} i(t)dt = C(v_n - v_0) \quad (1)$$

In Equation (1) above, C denotes a lumped load capacitance, i(t) is the derived current, $\{v_k\}$ with k={0, 1, 2, ..., n} denotes a predefined set of voltage values where times $\{t_k\}$ may be measured. $(t_0, v_0)$ denotes the first point in voltage waveform illustrated in FIG. 3C, and $(t_n, v_n)$ denotes the final point in the voltage waveform. Furthermore, FIG. 3C shows a plot 302C of the voltage waveform 308C with respect to the time axis 304C having the voltage values on the vertical voltage axis 306C.

To determine a current waveform, the set of inputs may be received at 202C. This set of inputs may be determined at 204A described above. A load may also be determined at 204C. In some embodiments where the load is more complicated (for example, distributed RC) than a lumped loading capacitance C, which is like the assumption made in a model (e.g., a CCST model) stored in a library file, then Equation (1) becomes more complex, but it still requires time domain integration of the current and is thus also contemplated.

A time domain expression for the time-varying current (e.g., the current waveform) may be determined at 206C in terms of the set of inputs. In some of these embodiments, a time domain expression for the time-varying current may be determined in terms of the set of voltage values. For example, some of these embodiments illustrated in FIG. 2C determines the time domain expression as a piecewise linear (PWL) derived current waveform from the set of inputs determined at 204A. It shall be noted that a piecewise linear expression of the derived current waveform is provided herein for the ease of explanation, and that other forms (e.g., quadratic, polynomial, etc.) of a derived current waveform may also be employed by using different arithmetic, mathematical, and/or numerical techniques and manipulations.

With the piecewise linear example for the derived current waveform, the current waveform i(t) may thus be represented by points $(t_k, i_k)$ for k=0, 1, ..., n. It shall be noted that $t_k$ are the same time points as in the simulated voltage waveform (e.g., in the set of electrical characteristics received at 202A).

With the set of inputs, the output load, the time domain expression for the current waveform, and the initial voltage, a derived current at each time point of the set of time points may be determined at 210C by using an integration technique to approximate the integration of current in Equation (1). For example, a plurality of integration techniques such as the trapezoidal method, the Euler method (first order), etc. may be used to approximate the integration in Equation (1). In the embodiments illustrated in FIG. 2C, the Euler method is used. For k=1, 2, ..., n, the following set of integration equations may be determined for load capacitance C from Equation (1):

$$i(t) = C\frac{dv}{dt} \Rightarrow i_k = C\frac{(v_k - v_{k-1})}{(t_k - t_{k-1})} \quad (2)$$

Equation (2) provides the derived currents at the set of voltage points k=1, 2, ..., n. Some embodiments further determine an initial voltage for the time domain expression at 208C. For k=1, it may be determined that $v_{k-1}=v_0=0$ for a rising waveform and 1 for a falling waveform (when voltage values are scaled or normalized by $V_{DD}$). The time point $t_0$ denotes the time point where simulated voltage waveform cross $v_0$. In some embodiments where the simulated voltage waveform crosses the same $v_0$ value multiple times, the time point for last crossing may be determined to be the time point of interest. In some embodiments, the value of $i_0$ may not be used during timing analysis and hence no formula is needed for $i_0$. In some other embodiments where a current model's (e.g., a CCST model) format requires a value for $i_0$, $i_0$ may be set to 0 (zero).

Moreover, $\{v_k\}$ in Equation (2) above denotes a set of n+1 voltage values (where k=0, 1, ..., n). The voltage values may be normalized to the rail voltage or $V_{DD}$. As described above, a set of simulated voltage values may be determined in several different ways (see, e.g., description for 202B above). For example, a set containing twelve (12) voltage values may be v={0, 0.02, 0.1, 0.2, ..., 0.9, 0.95, 0.98}. As another example, a set containing thirteen (13) voltage values may be v={0.001, 0.02, 0.05, 0.1, 0.2, ..., 0.9, 0.95, 0.98}. In some embodiments, $v_0$ is set to zero (0) for a rising waveform and to $V_{DD}$ or to 1 (one) when normalized to $V_{DD}$ for a falling waveform.

Furthermore, $\{t_k\}$ denotes a set of the time points when the simulated voltage waveform crosses $v_k$ for a rising waveform and crosses $(1-v_k)$ for a falling waveform. As described above, in some embodiments where the simulated voltage waveform crosses a selected voltage value multiple times, the latest time point at which the voltage waveform crosses the selected voltage value will be identified as the time point of interest.

Moreover, using above method, CCST integration formula is given as follows:

$$v_k = \frac{i_k}{C}(t_k - t_{k-1}) + v_{k-1} \quad (3)$$
$$k = 1, 2, \ldots, n$$

In Equation (3) above, $v_0=0$ for a rising waveform, and $v_0=1$ for falling waveform. This system of n equations in (3) can be arithmetically solved by computing the derived current value $$i_k = C\frac{(v_k - v_{k-1})}{(t_k - t_{k-1})} \text{ for } k = 1, 2, \ldots, n,$$

where C is the lumped load capacitance used in library characterization. Once all the derived current values ($i_k$) are determined, the current waveform may be determined by using the set of derived current values ($i_k$).

With the system of equations as described in Equation (3) above, the derived current values $i_k$ may be determined for each of the set of time points. In addition, because these derived current values are determined by using at least the set of voltage values as an input, the time varying derived current, when integrated, thus satisfies at least all of the voltage values in the set of voltage values that is used in formulating the system of equations expressed in Equation (3).

In some embodiments, the value of $i_0$ may not be used during timing analysis and hence no formula is needed for $i_0$ in these embodiments. In some other embodiments where a current model's (e.g., a CCST model) format requires a value for $i_0$, an initial derived current value may be determined at 212C. In some of these embodiments, $i_0$ may be set to 0 (zero). With a set of derived current values determined at 210C and optionally with the initial derived current value determined at 212C, a derived current waveform may be determined at 214C based at least in part upon the set of derived current values corresponding to the set of time points and optionally upon the initial derived current value.

Figure 2D:
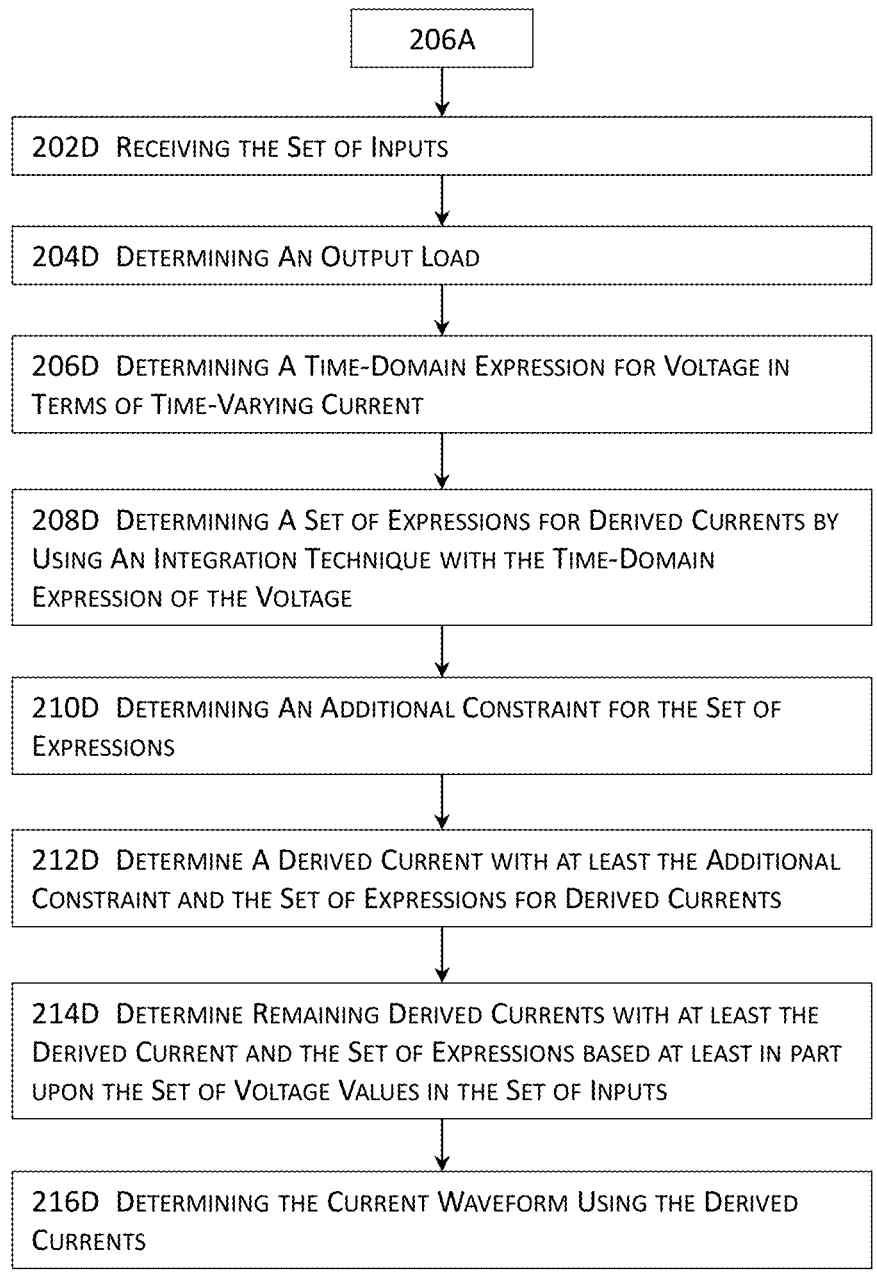
FIG. 2D illustrates more details about a portion of the high-level flow diagram illustrated in FIG. 2A in one or more embodiments.

FIG. 2D illustrates more details about a portion of the high-level flow diagram illustrated in FIG. 2A in one or more embodiments. More specifically, FIG. 2C illustrates more details of determining a set of inputs from the set of electrical characteristics at 206A of FIG. 2A or 206B of FIG. 2B.

To determine a current waveform, the set of inputs may be received at 202D. This set of inputs may be determined at 204A described above. A load may also be determined at 204D. For the sole purpose of easy explanation and illustration, the load in these embodiments illustrated in FIG. 2D comprises a simplified lumped loading capacitance C as that in the embodiments illustrated in FIG. 2C although it shall be noted that other more complex output load may also be used in determining a derived current waveform with more complex yet known arithmetic, mathematical, and/or numerical techniques.

Like the embodiments illustrated in FIG. 2C, a time domain expression for voltage may be determined at 206D in terms of a time-varying current (e.g., a current waveform) as:

$$v(t) = v_0(t) + \frac{1}{C}\int i(t)dt \quad (1')$$

In Equation (1') above, $v_0(t)$ denotes the initial voltage. The initial voltage $v_0(t)$ may be 0V for a rising output and $V_{DD}$ for a falling output in some embodiments. In some other embodiments where the voltages are normalized relative to $V_{DD}$, the initial voltage $v_0(t)$ may be 0 for a rising output and 1 for a falling output. In some embodiments where the load is more complicated (for example, distributed RC) than a lumped loading capacitance C described above then Equation (1') becomes more complex, but it still requires time domain integration of the current and is thus also contemplated.

For accurately computing delay, slew, and actual voltage waveform for timing propagation in STA, it is important that the integral (scaled by 1/C) of the current waveform stored in the .lib file matches the driver output voltage waveform that is obtained from spice simulation during library characterization. Typically, the points of interest on the voltage waveform for STA are pre-defined voltage thresholds that correspond to 2% of VDD, 5% of VDD, etc., as illustrated in FIG. 3A.

Figure 3A:
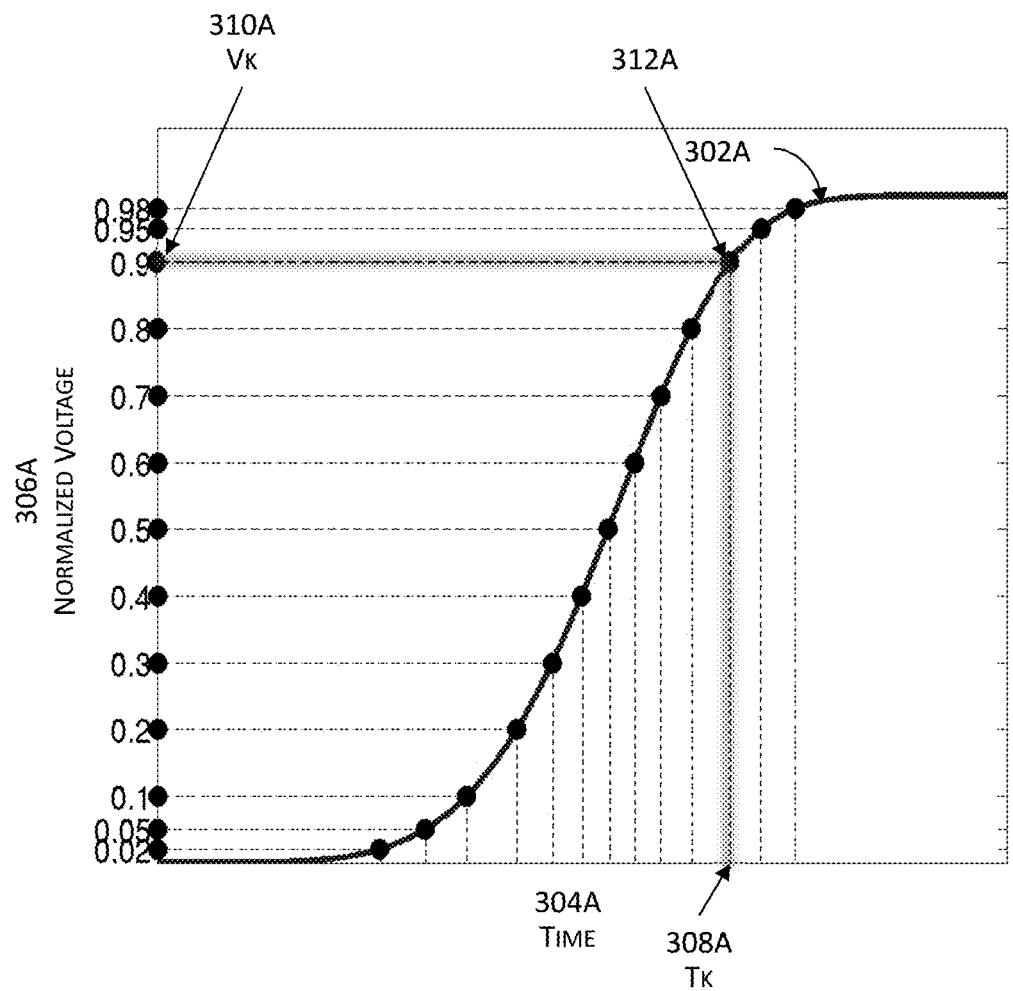
FIG. 3A illustrates an example portion of a voltage waveform in one or more embodiments.

More specifically, FIG. 3A illustrates a rising voltage waveform 302A plotted against the time axis 304A with voltage values on the normalized voltage axis 306A. In FIG. 3A, voltage values are normalized with respect to, for example, $V_{DD}$, and thus the normalized voltage values range between zero (0) and one (1). Every time the voltage waveform 302A crosses an individual voltage value (e.g., crossing at point 312A corresponding to the voltage value 310A), a corresponding time point 308A ($t_k$) is also identified into a set of time points so that the set of voltage values corresponds to the set of time points.

Figure 3B:
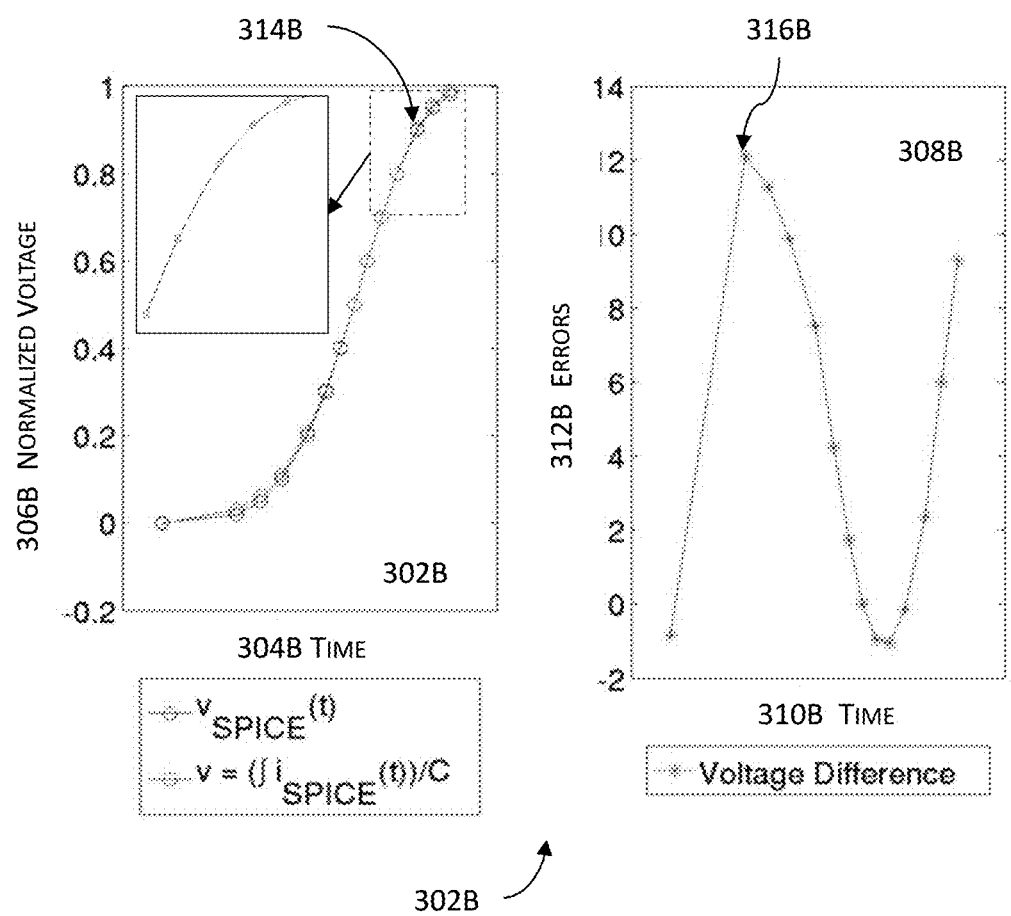
FIG. 3B illustrates an example where a small variation between a simulation voltage value and a derived voltage obtained from an integration technique results in a large error in the derived voltage obtained from the derived voltage.

In some embodiments where the current values in a current model stored in a library corresponding to the voltage values from simulation, there may exist a risk that the integral of the current waveform results in erroneous voltage values with several mV of error at various voltage values. This problem is illustrated in FIG. 3B where v(t) denotes the normalized voltage waveform from simulation and v is the sampled version for values illustrated in FIG. 3B.

Conventional approaches may simply resort to adding more points to the current waveform stored in .lib file may improve accuracy, but adding more points also increases the timing library size and runtime in timing analyses and delay calculations. One of the advantages of various embodiments is that these embodiments determine a set of derived current values (and hence a derived current waveform) which, when integrated, produces an exact match between the simulated voltage values (e.g., voltage values from a simulation) and the derived voltage values at least at each of the set of time points.

Moreover, conventional approaches for characterizing a current model may be based on simulating a cell with a certain input waveform and an output load and record current and voltage waveforms at the output, and pruning maximum number of points on the current waveform to still guarantee that when the current waveform is integrated, the slew and reference times match the values from NDLM table within certain tolerance. Nonetheless, these conventional approaches provide no guarantees for accuracy for the rest of the voltage thresholds on integrated waveform. Moreover, even slew and reference times may match NDLM values approximately, and the tail of the integrated voltage transition is also not guaranteed to reach full rail. Furthermore, the number of points kept in the current waveform in these approaches is usually high (e.g., more than 40 points) and thus leads to a large size of library to hinder the performance, efficiency, and/or effectiveness of such approaches.

In order to resolve at least the aforementioned problems and shortcomings of conventional approaches, some embodiments derive a current waveform from simulated voltages and simulated currents measured in a simulation during library characterization. Unlike the conventional approaches, these embodiments guarantee that circuit simulation with the derived current waveform produce voltages that match the simulated voltage waveform at the voltage values of the set of simulated voltage values as shown in FIG. 3E.

Another advantage of some embodiments described herein is that these embodiments proactively select a limited number of simulated voltage values at correspond time points, instead of or rather than starting with the entire set of voltage values and trimming, pruning, or filtering out one or more voltage values as in conventional approaches. These embodiments then generate a set of derived current values at these time points and use this set of derived current values to construct or represent a derived current waveform. A derived current thus generated, when integrated, produces the slew and reference times that match the corresponding values from, for example, an NDLM table within certain tolerance. These embodiments also guarantee that the tail of the integrated, derived voltage transition to reach full rail voltage. Moreover, various experiments have demonstrated that a selection of mere eight (8)-fifteen (15) voltage values produces sufficiently accurate results in subsequent timing analyses.

Referring back to FIG. 2D, with the time-domain expression for voltage determined at 206D, a set of relationships or expressions may be determined at 208D for a set of derived current values at the set of time points by using an integration technique with the time-domain expression. For a voltage waveform shown in FIG. 3C, Equation (1') may be expressed as:

$$\int_{t_0}^{t_n} i(t)dt = C(v_n - v_0), \quad (2')$$

In Equation (2') immediate above, C denotes a lumped load capacitance for the ease of explanation and illustration, i(t) denotes the derived current, and $\{v_k\}$ denotes a predefined set of voltage values, where times $\{t_k\}$ are measured. A point or time-value pair $(t_0, v_0)$ denotes the first point in voltage waveform, and $(t_n, v_n)$ denotes the final point in the voltage waveform. In some embodiments, the output is a lumped linear capacitive load, which is like the assumption made by, for example, a CCST model stored in the library.

Furthermore, some embodiments use a piecewise linear expression to represent i(t) in terms of a set of derived current values. In these embodiments, a derived current waveform may be represented by points or time-value pairs $(t_k, i_k)$ for k=0, 1, ..., n. In these embodiments, $t_k$ are the same time points as in the simulated voltage waveform in the set of electrical characteristics received from, for example, a simulation result. The integration of current may be approximated by using, for example, trapezoidal integration, resulting in the following set of relationships or expressions for the derived current values. For k∈[1, n], the set of relationships for the derived current values may be expressed as:

$$\left(\frac{i_k + i_{k-1}}{2}\right)(t_k - t_{k-1}) = C(v_k - v_{k-1}) \quad (3')$$

Furthermore, letting $$\alpha_k = \frac{2C(v_k - v_{k-1})}{t_k - t_{k-1}}$$

and with some rearrangement of Equation (3), Equation (4') may be obtained as follows:

$$i_k = \alpha_k - i_{k-1}, k=1,2,\ldots,n. \quad (4')$$

The above set of n equations have n+1 unknowns, $i_k$. In order to solve Equation (4'), one additional constraint may be determined at 210D. Some embodiments determine an additional constraint as to minimize the sum of squared errors between the derived current values and the simulated current values as expressed in Equation (5') below:

$$E(i_k) = \sum_{k=1}^{n}(i_k - i'_k)^2 \quad (5')$$

In Equation (5') immediately above, $i_k'$ denotes the simulated current values, as determined from a simulation, at time point $t_k$. To simplify the equations, some embodiments use Equation (3') and Equation (4') to first describe all $i_k$ as functions of $i_0$:

$$i_k = (-1)^k i_0 + \sum_{j=1}^{k} (-1)^{j+k} \alpha_j \qquad (6')$$

The sum of squared errors may then be described as a function of $i_0$:

$$E(i_0) = (i_0 - i'_0)^2 + \sum_{k=1}^{n} \left(\left((-1)^k i_0 + \sum_{j=1}^{k}(-1)^{j+k}\alpha_j\right) - i'_k\right)^2 \qquad (7')$$

Some embodiments may then determine a derived current value at 212D with the additional constraint of minimizing $E(i_0)$ by differentiating with respect to $i_0$:

$$\frac{dE(i_0)}{di_0} = 0, \qquad (8')$$

$$2(i_0 - i'_0) + \sum_{k=1}^{n} 2(-1)^k\left(\left((-1)^k i_0 + \sum_{j=1}^{k}(-1)^{j+k}\alpha_j\right) - i'_k\right) = 0, \qquad (9')$$

$$i_0 + a\sum_{k=1}^{n}\left((-1)^{2k}i_0 + \sum_{j=1}^{k}(-1)^{j+2k}\alpha_j\right) = i'_0 + \sum_{k=1}^{n}(-1)^k i'_k, \qquad (10')$$

$$(n+1)i_0 + \sum_{k=1}^{n}\sum_{j=1}^{k}(-1)^j \alpha_j = \sum_{k=0}^{n}(-1)^k i'_k, \qquad (11')$$

$$i_0 = \frac{1}{(n+1)}\left[\sum_{k=0}^{n}(-1)^k i'_k - \sum_{k=1}^{n}\sum_{j=1}^{k}(-1)^j \alpha_j\right] \qquad (12')$$

Having determined $i_0$ from Equation (12'), all the remaining $i_k$ may be determined accordingly at 214D using Equation (4'), $i_k = \alpha_k - i_{k-1}$. The derived current waveform may therefore be represented or constructed by the time-value pairs $(t_k, i_k)$ at 216D.

Some embodiments a current waveform and use the derived current waveform to compute the voltage values using trapezoidal integration for benchmark purposes. As shown in FIG. 3E, the derived voltage waveform resulting from the derived current waveform (or from the set of derived current values) matches the original voltage waveform with more than sufficient accuracy. As illustrated in FIG. 3E, the error is close to 0 mV on average across all threshold points.

In these embodiments illustrated in FIG. 2D, The set of inputs to the example process includes at least $\{v_k\}$, $\{t_k\}$, and $\{i_k'\}$ as described in greater details immediately below. $\{v_k\}$ denotes a set of n+1 simulated voltage values (k=0, 1, . . . , n) that is normalized to the rail voltage. For example, for n=14, v={0.001, 0.02, 0.05, 0.1, 0.2, . . . , 0.9, 0.95, 0.98}. $\{t_k\}$ denotes a set of the time points when the voltage waveform crosses $v_k$ for a rising waveform and $1-v_k$ for a falling waveform. $\{i_k'\}$ denotes a set of the simulated current values at time points $t_k$.

The outputs include $\{i_k\}$ that is a set of the derived current values at time points $t_k$ that may be used to construct or represent the derived current waveform.

To summarize the complex process of determining a derived current waveform illustrated in FIG. 2D, the process may first compute $$\alpha_k = \frac{2C(v_k - v_{k-1})}{t_k - t_{k-1}} \text{ for } k = 1, 2, \ldots, n,$$

where C is the corresponding lumped load capacitance and further compute $i_0$ with the following formula:

$$i_0 = \frac{1}{(n+1)}\left[\sum_{k=0}^{n}(-1)^k \cdot i_k - \sum_{k=1}^{n}\sum_{j=1}^{k}(-1)^j \cdot \alpha_j\right]$$

The remaining derived current values may be determined by computing $i_k$ for k=1, 2, . . . , n, in n steps (starting with $i_1$), where $i_k = \alpha_k - i_{k-1}$.

FIG. 3A illustrates an example portion of a voltage waveform in one or more embodiments. More specifically, FIG. 3A illustrates a rising voltage waveform 302A plotted against the time axis 304A with voltage values on the normalized voltage axis 306A.

In the example illustrated in FIG. 3A, voltage values are normalized with respect to, for example, $V_{DD}$, and thus the normalized voltage values range between zero (0) and one (1). Every time the voltage waveform 302A crosses an individual voltage value (e.g., crossing at point 312A corresponding to the voltage value 310A), a corresponding time point 308A ($t_k$) is also identified into a set of time points so that the set of voltage values corresponds to the set of time points.

FIG. 3B illustrates an example where a small variation between a simulation voltage value and a derived voltage obtained from an integration technique results in a large error in the derived voltage obtained from the derived voltage. More specifically, FIG. 3B illustrates a normalized voltage plot 302B with the curve 314B wherein the normalized voltage values 306B are plotted against the time axis 304B with normalized voltage values shown in the normalized voltage axis 306B.

FIG. 3B further illustrates a plot 308B where the error values 312B are plotted against the time axis 310B with error values shown in errors 312B. An error may range up to several millivolts, especially in the tail region 3142B which is very important for timing analyses. As illustrated in FIG. 3B, a small error between a simulated voltage value and a derived voltage value (e.g., derived from a set of derived current values or a derived current waveform) in 302B may result in, after integration, a larger or even an unacceptable error 316B.

Figure 3C:
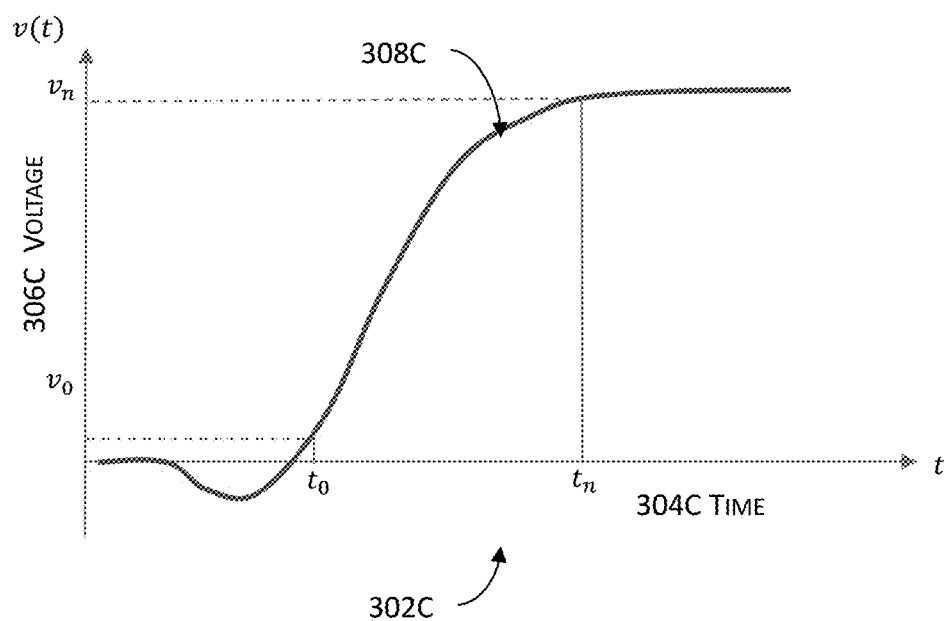
FIG. 3C illustrates an example voltage waveform for the description of some embodiments described herein.

FIG. 3C illustrates an example voltage waveform for the description of some embodiments described herein. More specifically, FIG. 3C shows a plot 302C of the voltage waveform 308C with respect to the time axis 304C having the voltage values on the vertical voltage axis 306C.

Figure 3D:
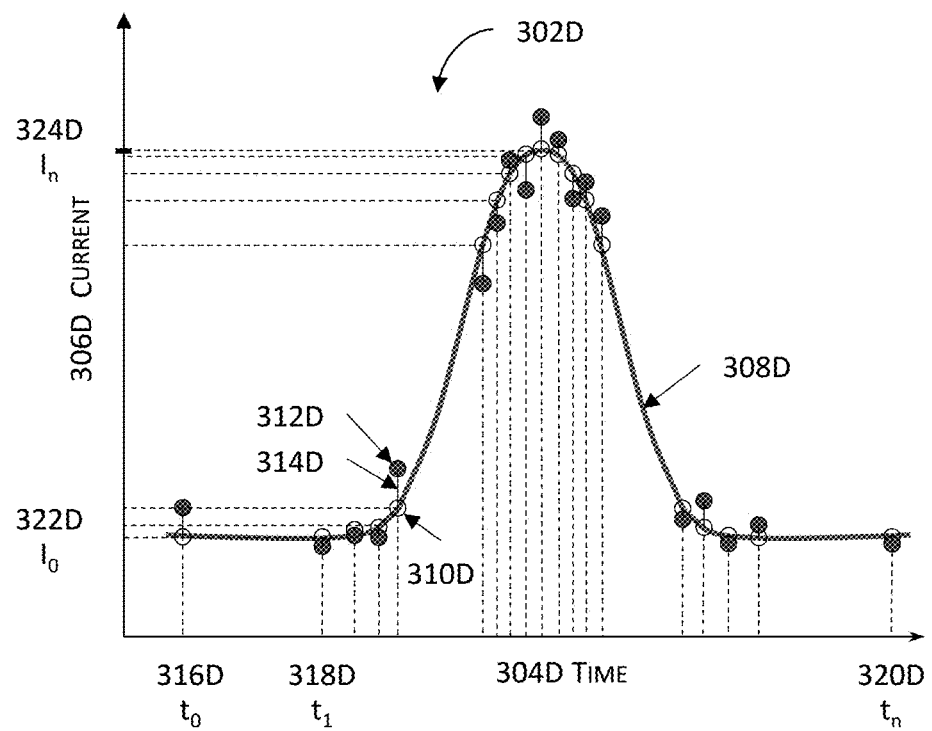
FIG. 3D illustrates a simplified example of the provided flexibility in selecting current values for some embodiments described herein.
Figure 3E:
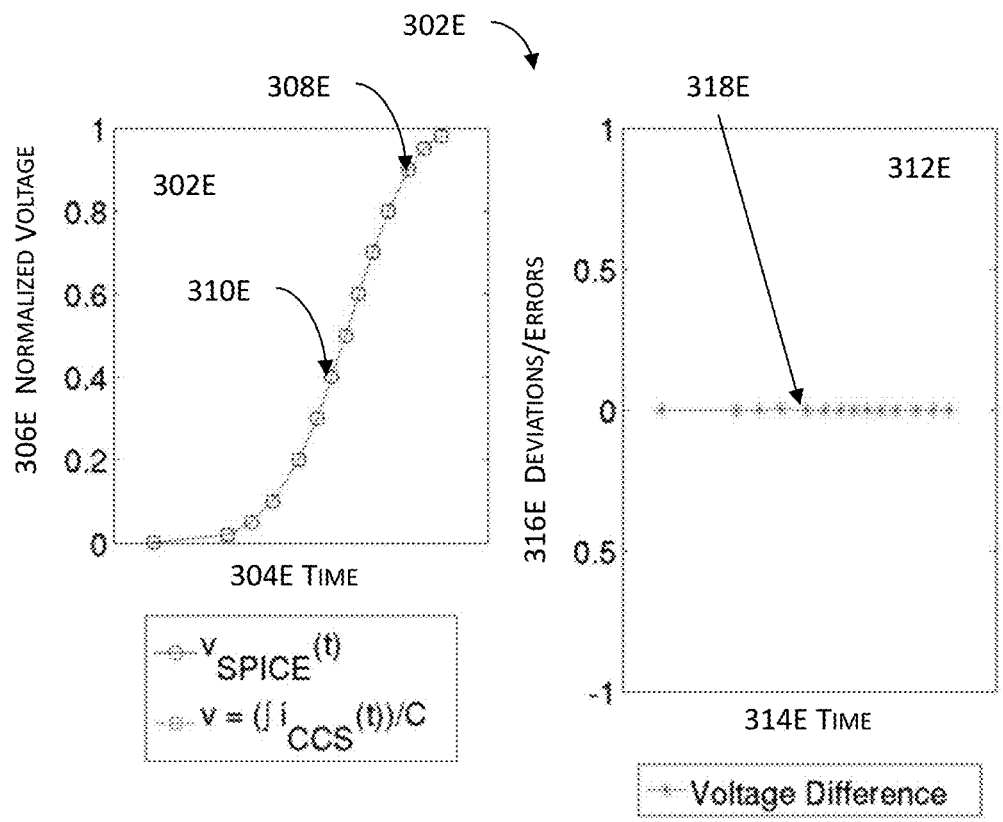
FIG. 3E illustrates an example benchmark result illustrating the expediency, efficiency, and accuracy of various techniques described herein in one or more embodiments.

FIG. 3D illustrates a simplified example of the provided flexibility in selecting current values for some embodiments described herein. More specifically, FIG. 3D illustrates the flexibility provided by some embodiments and/or techniques described herein in the determination of derived current values at various time points. In FIG. 3D, the plat 302D includes a simulated current waveform 308D having a plurality of simulated current values 310D along the simulated current waveform 308D.

Each simulated current value 310D of the plurality of simulated current values ($\{I_0$ (322D), . . . , $I_n$ (324D)$\}$ along the Current Value axis 306D corresponds to a time point of a plurality of time points $\{t_0$ (316D), $t_1$ (318D), . . . , $t_n$ (320D)} along the time axis 304D. FIG. 3D further illustrates the flexibility of selecting a current value (312D) that exhibits a deviation 314D from the simulated current value (310D) at a time point. Some embodiments described herein solve for a set of derived current values by using at least the set of simulated voltage values as a part of the input and use the set of derived current values to represent or construct a derived current waveform. Therefore, the integration of the derived current waveform produces derived or integrated voltage values at each of the set of time points in such a way that a derived or integrated voltage value at a time point matches the corresponding simulated voltage value at that time point.

That is, these embodiments described herein solve for a set of derived current values to represent or construct a derived current waveform by accounting for at least a set of simulated voltage values that is matched by a set of derived voltage values obtain from the integration of the derived current waveform. In theory, so long as a solution for a set of derived current values may be determined with a set of simulated voltage values, any deviation of an individual derived current value from the corresponding simulated current value may not affect the accuracy of the resulting derived current waveform.

Nonetheless, some embodiments select or determine one or more derived current values closer to the one or more corresponding simulated current values based at least in part upon one or more factors. These one or more factors may include, for example, a requirement for numerical stability, a display or aesthetic requirement for displaying the selected/determined derived current values in a user interface, etc. For example, selecting or determining one or more derived current values that deviate from the one or more corresponding simulated current values beyond a certain extent or threshold may introduce numerical instability in the solution process to solve for derived current values or in subsequent analyses.

As another example, displaying a derived current value exhibiting a large deviation from the corresponding simulated current value in a user interface may lead to a misunderstood or even erroneous interpretation of the displayed value as being incorrect despite the fact that such a derived current value (and hence the derived current waveform). Therefore, some embodiments may determine a derived current value having a reduced or smaller deviation from the corresponding simulated current value to avoid such misunderstood or even erroneous interpretations of the derived current value.

FIG. 3E illustrates an example benchmark result illustrating the expediency, efficiency, and accuracy of various techniques described herein in one or more embodiments. More specifically, FIG. 3E illustrates a voltage plot 302E of both the simulated voltage values 308E (e.g., from a SPICE simulation) and derived voltage values 310E (e.g., from integrating the derived current waveform described herein) against the time axis 304E with normalized voltage values shown in the normalized voltage axis 306E. FIG. 3E further illustrates a deviation or error plot 312E where the deviations 318E plotted against the time axis 314E with values shown in 316E are basically zero or some negligible, small numbers.

It shall be noted that various embodiments described herein refer to a required time window in the respective descriptions for the sole purpose and ease of illustration and description, and that other timing windows (e.g., arrival time) may also be used to achieve identical or substantially similar purposes and are thus also contemplated as a part of the description. It shall be further noted that other timing elements such as slacks (e.g., a positive slack, a negative slack, etc.), delays (e.g., a gate delay of a logic gate), etc. may also be considered in various embodiments described herein to determine, for example, a timing window of an aggressor, a susceptibility window of a victim, etc.

System Architecture Overview

Figure 4:
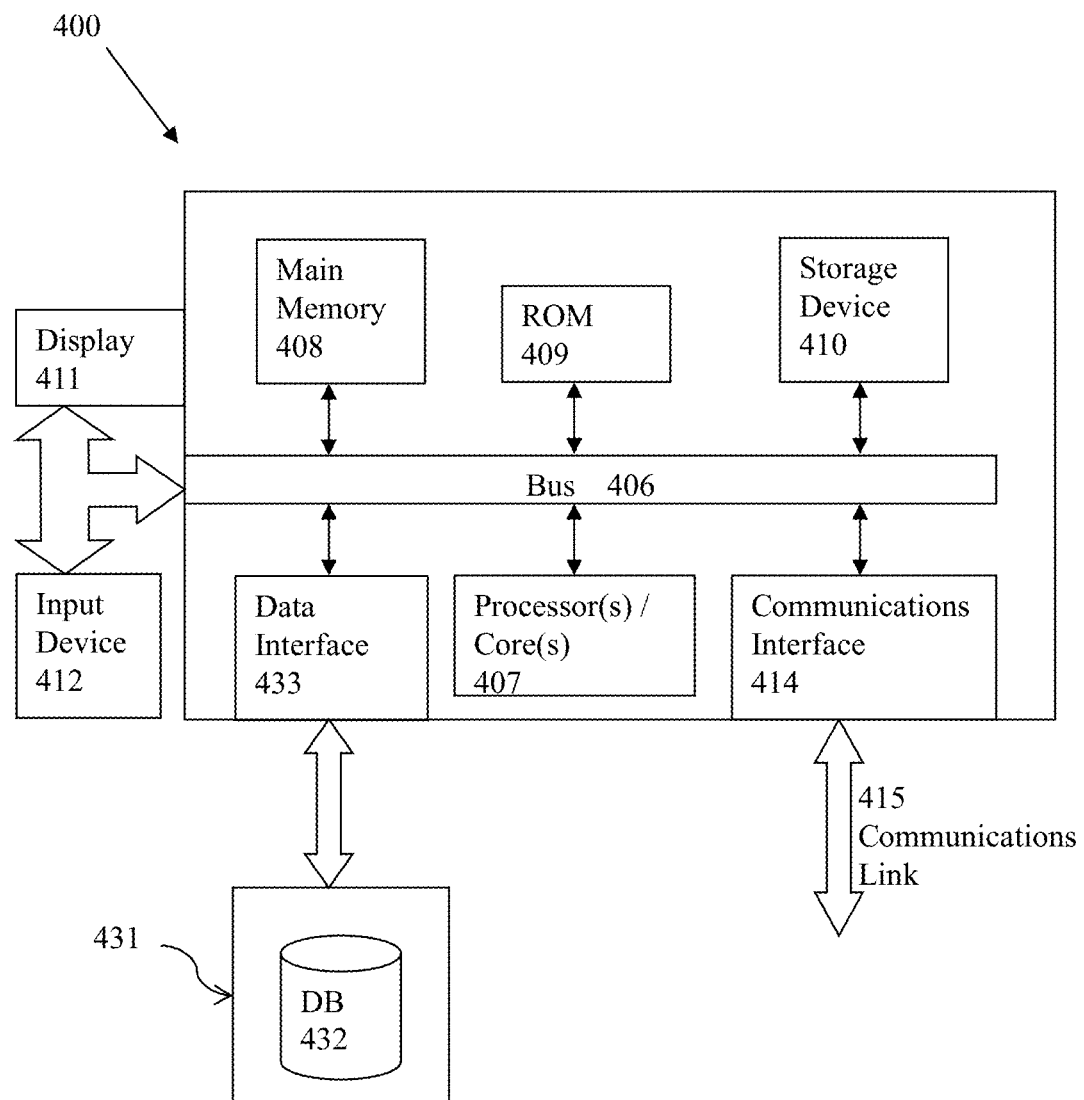
FIG. 4 illustrates a computerized system on which a method for characterizing timing behavior of an electronic design with a derived current waveform may be implemented.

FIG. 4 illustrates a computerized system on which a method for characterizing timing behavior of an electronic design with a derived current waveform may be implemented. Computer system 400 includes a bus 406 or other communication module for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

The illustrative computing system 400 may include an Internet-based computing platform providing a shared pool of configurable computer processing resources (e.g., computer networks, servers, storage, applications, services, etc.) and data to other computers and devices in a ubiquitous, on-demand basis via the Internet in some embodiments. For example, the computing system 400 may include or may be a part of a cloud computing platform (e.g., a public cloud, a hybrid cloud, etc.) where computer system resources (e.g., storage resources, computing resource, etc.) are provided on an on-demand basis, without direct, active management by the users in some embodiments.

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the acts of determination, extraction, simulating, annotating, analyzing, optimizing, and/or identifying, etc. descried herein may be performed by one or more processors, one or more processor cores, or combination thereof.

The term "computer readable storage medium" or "computer usable storage medium" as used herein refers to any non-transitory medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program (e.g., application code) through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

Various embodiments described herein provide the capability of handling electronic design spanning across multiple design fabrics, each having one or more hierarchical levels and also accommodate different process design kits (PDKs) for different electronic designs. In addition, the described embodiments handle any extracted model spanning across multiple design fabrics. Moreover, for each design fabric, these embodiments need not make a copy of the entire design hierarchy for creating an extracted view. These embodiments also determine an optimal hierarchical level in an electronic design (mono-fabric or cross-fabric) to which the copy of the schematic hierarchy is to be made. These embodiments further provide the capability of reusing existing simulation models for one or more sets of circuit components (e.g., a hierarchical block). Furthermore, these embodiments generate an extracted view where an optimal hierarchical level is determined for each design fabric. As a result, the embodiments described herein fully address the problems with and shortcomings of conventional approaches and drastically improve and expand the capability of conventional approaches.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. The examples described herein are provided to illustrate more broadly applicable aspects of the invention. Various changes may be made to any of the examples or embodiments described herein, and equivalents thereof may be substituted without departing from the true spirit and scope of these examples or embodiments described herein.

In addition, many modifications may be made to adapt a particular situation, material, composition of matter, system, module, process, and/or process act(s) or step(s) to the objective(s), spirit or scope of the present invention. Further, as will be appreciated by those with skill in the art, each of the individual variations, examples, and/or embodiments, etc. described and illustrated herein has discrete components and features which may be readily separated from or combined with the feature or features of any of the other several variations, examples, and/or embodiments, etc., without departing from the scope or spirit of various variations, examples, and/or embodiments, etc. described herein. All such modifications are intended to be within the scope of claims associated with this disclosure. Moreover, various embodiments or portion(s) thereof described herein may be combined to provide further embodiments. Any aspects of the embodiments may be modified, if necessary, to employ concepts of the various variations, examples, and/or embodiments, etc. described herein to provide yet further embodiments.

We claim:

1. A computer implemented method for characterizing timing behavior of an electronic design with a derived current waveform, comprising:
   receiving a set of electrical characteristics of an electronic design or a portion thereof;
   determining a set of inputs that comprises a plurality of input current values and a plurality of input voltage values from the set of electrical characteristics;
   determining, at one or more modules stored in memory and executing in conjunction with a microprocessor of a computing node, a derived current waveform comprising a plurality of derived current values based at least in part upon the set of inputs, while allowing one or more derived current values in the plurality of derived current values to deviate beyond a predetermined tolerance from one or more corresponding input current values in the plurality of input current values to at least approximately match an input voltage values of the plurality of input voltage values; and
   characterizing the electronic design or the portion thereof based at least in part upon the derived current waveform.

2. The computer implemented method of claim 1, wherein determining the set of inputs comprises:
   determining a set of simulated voltage values from the set of electrical characteristics based at least in part upon one or more criteria; and
   determining a set of time points, wherein each time point in the set of time points corresponds to a simulated voltage value in the set of simulated voltage values.

3. The computer implemented method of claim 2, wherein determining the set of inputs further comprises:
   determining a set of simulated current values from the set of electrical characteristics based at least in part upon the set of time points.

4. The computer implemented method of claim 1, wherein determining the set of inputs comprises:
   determining an output load for the electronic design or the portion thereof.

5. The computer implemented method of claim 1, wherein determining the derived current waveform comprises:
   receiving the set of inputs and an output load for the electronic design or the portion thereof, wherein a deviation of an electric current value from a corresponding input current value beyond the tolerance is determined to be an unacceptable deviation; and
   determining a time-domain expression for a time-varying current, wherein the time-domain expression correlates the time-varying current with the set of inputs.

6. The computer implemented method of claim 5, wherein determining the derived current waveform further comprises:
   determining an initial voltage value for the time-domain expression for the time-varying current; and
   determining a derived current value at a time point of a set of time points, wherein the time point in the set of time points corresponds to a simulated voltage value in a set of simulated voltage values of the set of inputs.

7. The computer implemented method of claim 6, wherein determining the derived current waveform further comprises:
   determining the derived current waveform based at least in part upon the derived current value at the time point of the set of time points.

8. The computer implemented method of claim 7, wherein determining the derived current waveform further comprises:
   determining an initial derived current value for the derived current waveform.

9. The computer implemented method of claim 1, wherein determining the derived current waveform comprises:
   receiving the set of inputs and an output load for the electronic design or the portion thereof; and
   determining a time-domain expression for voltage, wherein the time-domain expression correlates the voltage with a time-varying current.

10. The computer implemented method of claim 9, wherein determining the derived current waveform further comprises:
   determining a set of expressions for a set of derived current values at least by using an integration technique with the time-domain expression of the voltage; and
   determining an additional constraint for the set of expressions.

11. The computer implemented method of claim 10, wherein determining the derived current waveform further comprises:
   determining a derived current value with at least the additional constraint and the set of expressions for derived current values; and
   determining one or more remaining derived current values with at least the derived current value and the set of expressions based at least in part upon a set of simulated voltage values in the set of inputs.

12. The computer implemented method of claim 11, wherein determining the derived current waveform further comprises:
   determining the derived current waveform based at least in part upon the derived current value and the one or more remaining derived current values.

13. A system for characterizing timing behavior of an electronic design with a derived current waveform, comprising:
   a microprocessor; and
   a non-transitory computer accessible storage medium storing thereupon a sequence of instructions which, when executed by the microprocessor, causes the microprocessor at least to:
      receive a set of electrical characteristics of an electronic design or a portion thereof;
      determine a set of inputs that comprises a plurality of input current values and a plurality of input voltage values from the set of electrical characteristics;
      determine a derived current waveform comprising a plurality of derived current values based at least in part upon the set of inputs, while allowing one or more derived current values in the plurality of derived current values to deviate beyond a predetermined tolerance from one or more corresponding input current values in the plurality of input current values to at least approximately match an input voltage values of the plurality of input voltage values; and
      characterize the electronic design or the portion thereof based at least in part upon the derived current waveform.

14. The system for claim 13, wherein the sequence of instructions which, when executed by the microprocessor, causes the microprocessor to determine the susceptibility window further comprises instructions whose execution further causes the microprocessor to:
   determine a set of simulated voltage values from the set of electrical characteristics based at least in part upon one or more criteria;
   determine a set of time points, wherein each time point in the set of time points corresponds to a simulated voltage value in the set of simulated voltage values;
   determine an output load for the electronic design or the portion thereof; and
   determine a set of simulated current values from the set of electrical characteristics based at least in part upon the set of time points.

15. The system for claim 13, wherein the sequence of instructions which, when executed by the microprocessor, causes the microprocessor to determine the timing window for the set of multiple aggressors further comprises instructions whose execution further causes the microprocessor to:
   receive the set of inputs and an output load for the electronic design or the portion thereof;
   determine a time-domain expression for a time-varying current, wherein the time-domain expression correlates the time-varying current with the set of inputs;
   determine an initial voltage value for the time-domain expression for the time-varying current;
   determine a derived current value at a time point of a set of time points, wherein the time point in the set of time points corresponds to a simulated voltage value in a set of simulated voltage values of the set of inputs;
   determine the derived current waveform based at least in part upon the derived current value at the time point of the set of time points; and
   determine an initial derived current value for the derived current waveform.

16. The system for claim 13, wherein the sequence of instructions which, when executed by the microprocessor, causes the microprocessor to determine the susceptibility window for the internal node of the victim further comprises instructions whose execution further causes the microprocessor to:

receive the set of inputs and an output load for the electronic design or the portion thereof;

determine a time-domain expression for voltage, wherein the time-domain expression correlates the voltage with a time-varying current;

determine a set of expressions for a set of derived current values at least by using an integration technique with the time-domain expression of the voltage;

determine an additional constraint for the set of expressions;

determine a derived current value with at least the additional constraint and the set of expressions for derived current values;

determine one or more remaining derived current values with at least the derived current value and the set of expressions based at least in part upon a set of simulated voltage values in the set of inputs; and determine the derived current waveform based at least in part upon the derived current value and the one or more remaining derived current values.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for characterizing timing behavior of an electronic design with a derived current waveform, the set of acts comprising:

receiving a set of electrical characteristics of an electronic design or a portion thereof;

determining a set of inputs that comprises a plurality of input current values and a plurality of input voltage values from the set of electrical characteristics;

determining, at one or more modules stored in memory and executing in conjunction with a microprocessor of a computing node, a derived current waveform comprising a plurality of derived current values based at least in part upon the set of inputs, while allowing one or more derived current values in the plurality of derived current values to deviate beyond a predetermined tolerance from one or more corresponding input current values in the plurality of input current values to at least approximately match an input voltage values of the plurality of input voltage values; and characterizing the electronic design or the portion thereof based at least in part upon the derived current waveform.

18. The article of manufacture of claim 17, the set of acts further comprising:

determining a set of simulated voltage values from the set of electrical characteristics based at least in part upon one or more criteria;

determining a set of time points, wherein each time point in the set of time points corresponds to a simulated voltage value in the set of simulated voltage values;

determining an output load for the electronic design or the portion thereof; and determining a set of simulated current values from the set of electrical characteristics based at least in part upon the set of time points.

19. The article of manufacture of claim, the set of acts further comprising:

receiving the set of inputs and an output load for the electronic design or the portion thereof, wherein a deviation of an electric current value from a corresponding input current value beyond the tolerance is determined to be an unacceptable deviation;

determining a time-domain expression for a time-varying current, wherein the time-domain expression correlates the time-varying current with the set of inputs;

determining an initial voltage value for the time-domain expression for the time-varying current;

determining a derived current value at a time point of a set of time points, wherein the time point in the set of time points corresponds to a simulated voltage value in a set of simulated voltage values of the set of inputs;

determining the derived current waveform based at least in part upon the derived current value at the time point of the set of time points; and determining an initial derived current value for the derived current waveform.

20. The article of manufacture of claim 17, the set of acts further comprising:

receiving the set of inputs and an output load for the electronic design or the portion thereof;

determining a time-domain expression for voltage, wherein the time-domain expression correlates the voltage with a time-varying current;

determining a set of expressions for a set of derived current values at least by using an integration technique with the time-domain expression of the voltage;

determining an additional constraint for the set of expressions;

determining a derived current value with at least the additional constraint and the set of expressions for derived current values;

determining one or more remaining derived current values with at least the derived current value and the set of expressions based at least in part upon a set of simulated voltage values in the set of inputs; and determining the derived current waveform based at least in part upon the derived current value and the one or more remaining derived current values.

* * * * *